(12) United States Patent
Saban et al.

(10) Patent No.: US 10,833,541 B2
(45) Date of Patent: Nov. 10, 2020

(54) TOOTH-WOUND STATOR ASSEMBLY

(71) Applicant: UNISON INDUSTRIES, LLC, Jacksonville, FL (US)

(72) Inventors: Daniel Michael Saban, Norwich, NY (US); Charles Michael Stephens, Pattersonville, NY (US)

(73) Assignee: UNISON INDUSTRIES, INC., Jacksonville, FL (US)

( * ) Notice: Subject to any disclaimer, the term of this patent is extended or adjusted under 35 U.S.C. 154(b) by 591 days.

(21) Appl. No.: 15/358,062

(22) Filed: Nov. 21, 2016

(65) Prior Publication Data

US 2018/0145547 A1 May 24, 2018

(51) Int. Cl.
*H02K 1/14* (2006.01)
*H02K 15/06* (2006.01)
*H02K 3/34* (2006.01)

(52) U.S. Cl.
CPC ........... *H02K 1/148* (2013.01); *H02K 15/066* (2013.01); *H02K 3/345* (2013.01); *H02K 2203/12* (2013.01); *H02K 2213/03* (2013.01)

(58) Field of Classification Search
CPC ...... H02K 1/148; H02K 15/066; H02K 3/345; H02K 2203/12; H02K 2213/03
See application file for complete search history.

(56) References Cited

U.S. PATENT DOCUMENTS

| | | | | |
|---|---|---|---|---|
| 7,737,598 B2* | 6/2010 | Ionel | ...................... | H02K 1/148 310/216.058 |
| 2003/0030345 A1* | 2/2003 | Enomoto | ............... | H02K 1/148 310/216.096 |
| 2003/0094876 A1* | 5/2003 | Hsu | .......................... | H02K 3/18 310/185 |
| 2003/0197443 A1* | 10/2003 | Lawrence | .............. | H02K 1/148 310/216.058 |
| 2008/0084126 A1* | 4/2008 | Lee | ........................ | H02K 1/187 310/43 |
| 2009/0140614 A1* | 6/2009 | Heim | ...................... | H02K 11/25 310/68 C |
| 2013/0200742 A1* | 8/2013 | Seki | ........................ | H02K 1/148 310/195 |
| 2014/0217837 A1* | 8/2014 | Jaganjac | ................... | H02K 1/18 310/45 |
| 2015/0137652 A1* | 5/2015 | Petter | ..................... | H02K 21/16 310/216.072 |
| 2015/0188371 A1* | 7/2015 | Kato | ........................ | H02K 3/12 310/208 |
| 2016/0352172 A1* | 12/2016 | Fan | ........................ | H02K 1/148 |

OTHER PUBLICATIONS

F. Libert et al., "Manufacturing Methods of Stator Cores with Concentrated Windings," Royal Institute of Technology, Department of Electrical Machines and Power Electronics, 100 44 Stockholm, Sweden, 5 pages.

\* cited by examiner

*Primary Examiner* — Jue Zhang
(74) *Attorney, Agent, or Firm* — Wood IP LLC

(57) ABSTRACT

There is provided a stator and a method of making the same. For example, there is provided a stator that includes a single piece yoke and a set of teeth mounted on an inner surface of the single piece yoke. Each tooth is pre-wound with a coil and includes a tail portion configured to secure the tooth on the inner surface. Furthermore, at least two teeth of the set of teeth are mounted on the single piece yoke at a slot opening distance of less than about 35%.

17 Claims, 4 Drawing Sheets

TOOTH-WOUND STATOR ASSEMBLY

I. TECHNICAL FIELD

The present disclosure generally relates to stators and methods for manufacturing the same, and more specifically, to a tooth-wound stator and method for manufacturing the same.

II. BACKGROUND

In assembling stators for electric motors, factory automation is desirable because of the need for repeatability and reliability in the assembly process. Typical automatic stator-winding processes suffer from lower slot fill and longer end turns when compared to manual assembly processes. Lower slot fill and longer end turns can lead to performance degradation, often making the target performance unachievable. However, automatic winding processes are still widely used because repeatability and reliability are the governing constraints in large volume manufacturing applications.

III. SUMMARY

The embodiments featured herein provide stator assemblies that utilize automatic winding processes that yield higher slot fill than manual or conventional automatic winding processes, thus ensuring repeatability and reliability without compromising performance.

The embodiments provide lower end turn resistance and inductance, which results from the readily achievable shorter end turns, as shall be apparent in the descriptions below. Further, the embodiments provide higher power density, with lower loss density, as result of more coil being disposed around the stator's teeth. As such, the fluxes achieved in the embodiments can be higher than what is achievable with stators assembled through conventional means. Moreover, the embodiments allow greater material cost productivity because they permit the use of different steel in teeth and yoke of the stator, especially for edge-wound yokes.

One embodiment provides a stator. The stator includes a single piece yoke and a set of teeth mounted on an inner surface of the single piece yoke. Each tooth is pre-wound with a coil and includes a tail portion configured to secure the tooth on the inner surface. Furthermore, at least two teeth of the set of teeth are mounted on the single piece yoke at a slot opening distance of less than about 35%.

Another embodiment provides a method for assembling a stator of an electric machine. The method includes providing a single piece yoke and winding each tooth of a set of teeth with a coil. The method further includes mounting each tooth on an inner surface of the single piece yoke, subsequent to the winding. Furthermore, at least two teeth of the set of teeth are mounted on the single piece yoke at a slot opening distance of less than about 35%.

Additional features, modes of operations, advantages, and other aspects of various embodiments are described below with reference to the accompanying drawings. It is noted that the present disclosure is not limited to the specific embodiments described herein. These embodiments are presented for illustrative purposes. Additional embodiments, or modifications of the embodiments disclosed, will be readily apparent to persons skilled in the relevant art(s) based on the teachings provided.

IV. BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are for purposes of illustrating the embodiments and are not to be construed as limiting the disclosure. Given the following enabling description of the drawings, the novel aspects of the present disclosure should become evident to a person of ordinary skill in the relevant art(s).

V. DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Exemplary stators according to the embodiments featured in the present disclosure can be used in electric motors having armature coils wound about individual stator teeth, as opposed to armature coils that span two or more stator slots, such as typical stators that utilize winding. In the embodiments, stator teeth are separable from a stator yoke such that the teeth can be wound individually or in groups and subsequently inserted into the stator. As such, these embodiments provide higher slot fill and shorter end-turns when compared to stator assemblies that rely on conventional manual insertion methods. Further, in the embodiments, teeth and yoke are separable, which means that they each can be made of a different material, thereby allowing performance versus cost trade-offs that are not possible in the current state-of-the-art. Several of the aforementioned embodiments are described in greater detail below.

Figure 1:
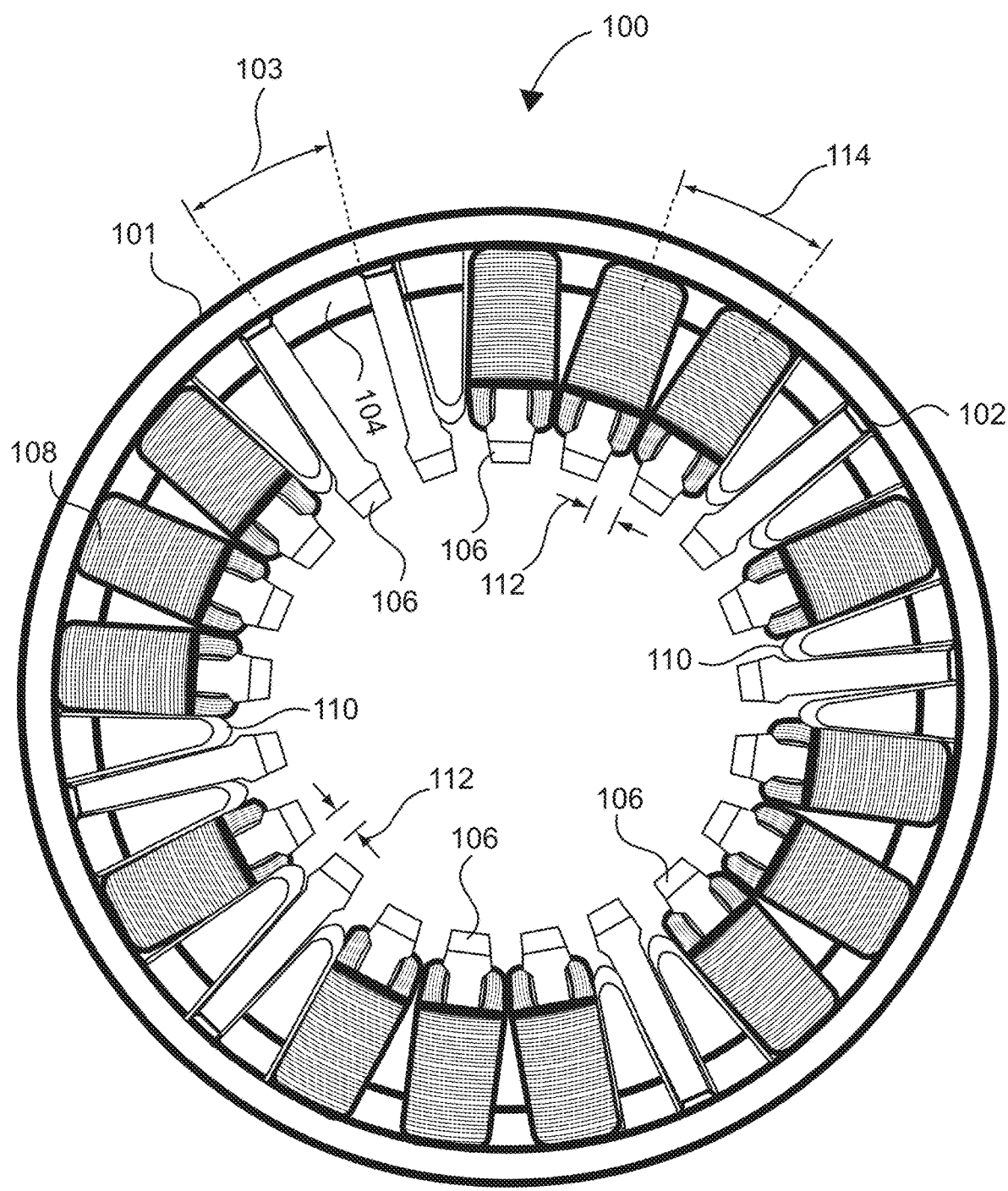
FIG. 1 illustrates a stator assembly in accordance with several aspects described herein.
Figure 2:
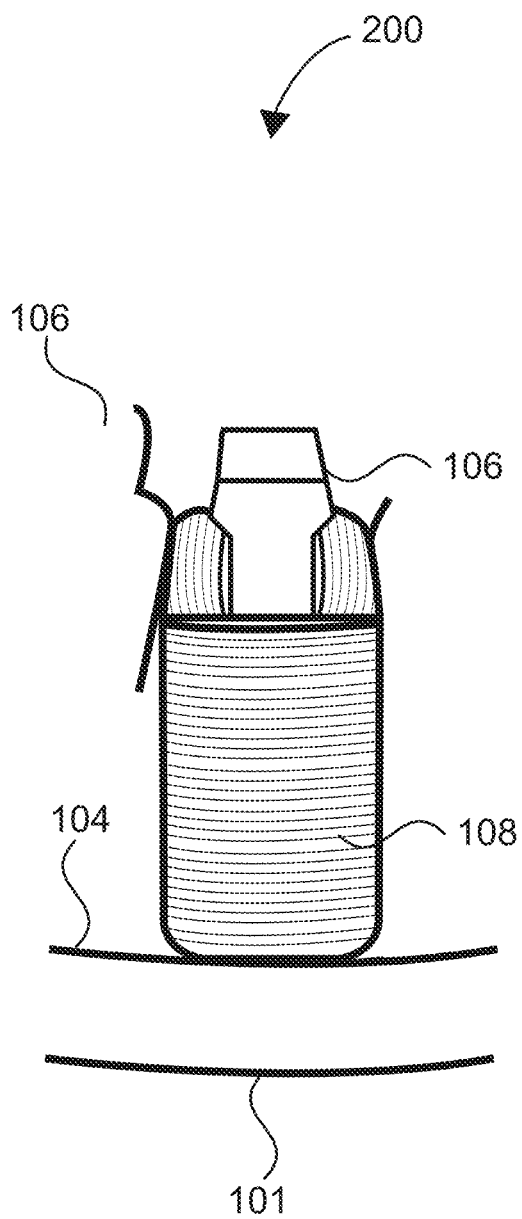
FIG. 2 illustrates a stator tooth in accordance with several aspects described herein.

FIG. 1 illustrates a stator assembly 100. The stator assembly 100 includes a single piece yoke 101 that includes an inner surface 104 throughout which are disposed a set of teeth 106 that mate with the inner surface 104 at an interface 102. The space between any two teeth 106 forms a slot 103. The interface 102 can include a set of features disposed at a specific predetermined pitch denoted in FIG. 1 by the distance 114, the features being configured to receive tail portions of the teeth 106 in order to secure them on the inner surface 104. A close up view 200 in FIG. 2 illustrates a tooth 106 that is pre-wound and inserted into the stator at the inner surface 104.

Turning back to FIG. 1, each tooth 106 can include a radially outward end portion that corresponds to the shape of a receiving feature of the inner surface 104, thereby allowing one to secure the tooth 106 in the slot. In some embodiments, the tooth 106 can have a dove tail shape, and the receiving feature can be appropriately shaped to receive the dove tail-shaped end of the tooth 106. One such embodiment is shown in the close up view 300 of FIG. 3, which illustrates a tooth 106 having a dove tail-shaped end in the form of a tail portion 302. One of skill in the art will readily recognize that such a shape is exemplary and that other shapes can be used without departing from the scope of the present disclosure.

Each tooth 106 can be pre-wound before being mounted on the inner surface 104. Winding can be achieved using a bobbin winding process, for example, but other winding methods known in the art can be used without departing from the scope of the disclosure. The winding process is used to mount a coil 108 on the tooth 106 to create a magnetic component of the stator assembly 100. The coil can be a copper filament that is wound according to an automatic winding process. Each tooth 106 that is pre-wound can be encapsulated in an encapsulation layer, which may be, for example and not by limitation, an epoxy resin. Generally, the encapsulation layer can be any insulating layer or dielectric material that can be used to insulate stator coils.

In the stator assembly 100, a pair of teeth of 106 can be pre-wound and mounted at a slot opening distance 112. The slot opening distance 112 can be expressed as a percentage of the distance 114, which is the length of the arc extending from the center of one tooth 106 to an adjacent tooth 106 at the stator inner diameter, which corresponds, as mentioned above, to the pitch of the tooth-receiving features in the inner surface 104.

The stator assembly 100 allows for the slot opening distance 112 to be much more reduced compared to the slot opening distances achievable in conventional stator assemblies. For example, and not by limitation, the slot opening distance 112 can be less than about 35% percent of the distance 114. In contrast, in conventional stator assemblies, the slot opening distance must be sufficiently large (i.e., greater than 35%) to accommodate an insertion process of pre-wound coils, or to accommodate the thickness of an orbit winding needle inserted from the stator's inner diameter that threads conductor off from the needle.

In other embodiments, the slot opening distance 112 can be reduced to be less than about 33% of the distance 114. In yet other embodiments, the slot opening distance 112 can be either less than about 30%, less than about 20%, or less than about 15% of the distance 114. Generally, the embodiments allow the slot opening distance 112 to be reduced so that particular magnetic features can be enhanced, such as an improved radial flux conduction across the airgap between the teeth or a reduction of rotor losses caused by flux variations related to the slot opening distance 112.

In the stator assembly 100, where a tooth 106 remains unwound and an adjacent tooth 106 is wound, a member 110 can be inserted between the wound tooth 106 and the un-wound tooth to ensure the compression of the side of the coil 108 against the tooth surface. Even if not all the teeth 112 are wound, they can be mounted on the inner surface 102 at a uniform slot opening distance. The member 110 can be a non-metallic piece that is substantially V-shaped, and it can be compressible so as to perform the above-mentioned coil-side compression function.

Generally, the stator assembly 100 can include a single piece yoke. The stator assembly can include a set of teeth in which each tooth is pre-wound with a coil. The teeth can each include a radially outward tail portion configured to fit in a receiving feature of an inner surface of the single piece yoke. At least two teeth of the set of teeth can be mounted on the single piece yoke with a slot opening distance of less than about 35%.

In the stator assembly 100, at least one tooth can be made from a material that is different from a material of the single piece yoke. For example, at least one tooth can be made of oriented steel, whereas the single piece yoke can be made of non-oriented steel. In such a utilization of oriented steel, the orientation of the steel is directed along the radially outward aspect of the tooth, thus giving the tooth superior flux conduction. In other embodiments, the teeth and the single piece yoke can be made of the same material The stator assembly 100 can further include a member disposed between a wound tooth and an un-wound tooth. The member can be substantially V-shaped. Furthermore, in the stator assembly 100, teeth from the set of teeth are separable from the single piece yoke, and the single piece yoke can be an edge-wound yoke.

Figure 4:
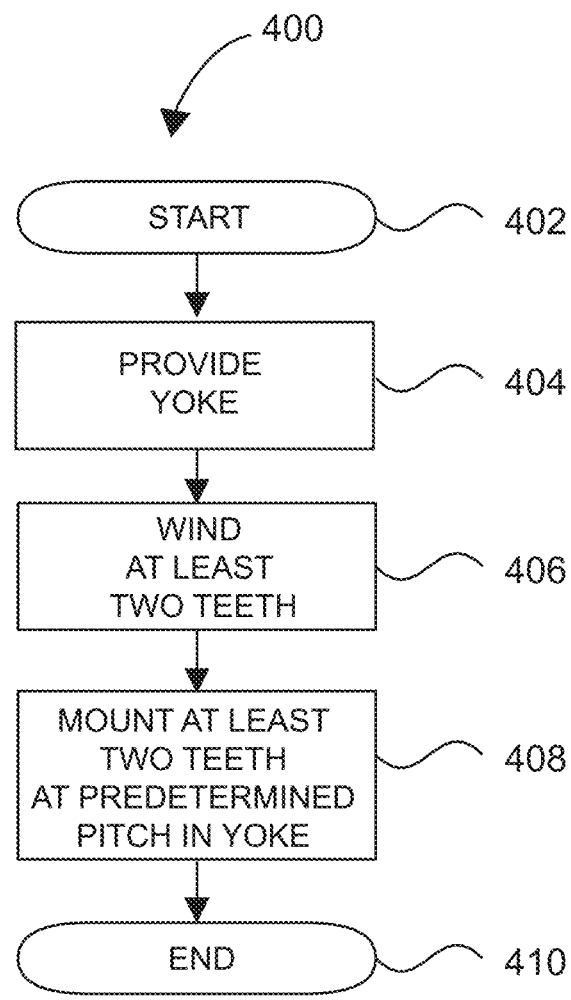
FIG. 4 depicts a flow chart of a method in accordance with several aspects described herein.

Having described an exemplary stator assembly, a method 400 consistent with assembling a stator is now described with respect to FIG. 4. The method 400 can being at step 402, and it includes providing a single piece yoke a step 404. The method 400 further includes winding at least two teeth (step 406) according to an automated winding process, such as a bobbin winding process, for example. The method 400 further includes mounting the at least two wound teeth at a predetermined pitch in the yoke (step 408). Stated otherwise, the method 400 includes, at step 408, mounting the at least two wound teeth at a predetermined slot opening distance. The method 410 can end at step 410.

Generally, the method 400 can be used for assembling a stator of an electric machine, such as, for example, an electric machine including tooth-wound armature coils. The method 400 can include providing a single piece yoke including a set tooth-receiving features formed in an inner surface of the single piece yoke. The method 400 can include winding each tooth of a set of teeth with a coil and mounting, subsequent to the winding, and mounting the teeth on the single piece yoke. At least two teeth of the set of teeth can be mounted on the single piece yoke with a slot opening distance of less than about 35%.

The method 400 can further include encapsulating the coil, subsequent to the winding. And it can include providing a member between a tooth from the at least two teeth and un-wound tooth. The member can be a substantially V-shaped member like the member 110 shown in FIG. 1.

Figure 3:
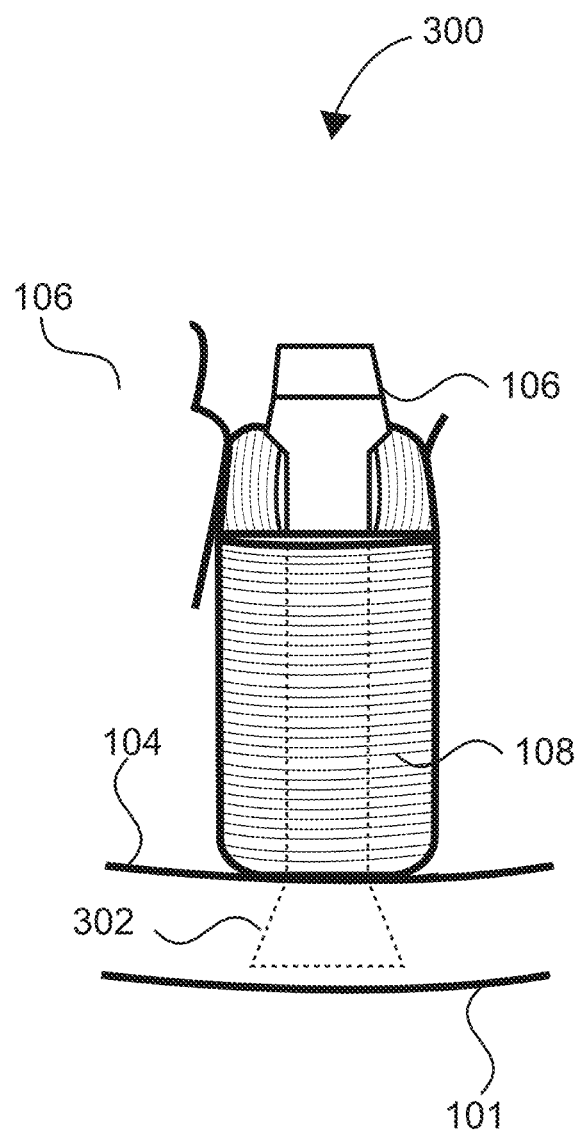
FIG. 3 illustrates a stator tooth in accordance with several aspects described herein.

In the method 400, each tooth-receiving feature of the single piece yoke can be configured to allow mating with a tail end of a tooth from the set of teeth (as shown in FIG. 3). The tooth's end can be a dove tail-shaped portion. In the method 400, the coil can be copper filament, and the winding can be performed through an automated winding process.

The embodiments featured herein offer several advantages. For example, separable teeth can be used as a bobbin on a spindle winding machine, or they can be held in place for an orbit winder. Winding layers can be programmed to be decreasing in turn count and formed into a wedge to maximize the slot fill. Since the coils are wound in place rather than inserted into slot openings (i.e. in between already mounted and unwound teeth), shorter end turns are possible.

With the embodiments, the stator slot opening can now be tuned for performance (typically made smaller to minimize rotor losses) without limits imposed by the wire size making up the coil. Further, the separable teeth allow a high performance, and when higher cost materials are used for the teeth, the fabrication of stator can be performed with very little waste of material. This allows for higher performance (flux density) without incurring the cost of high performance steel for the entire stator (the majority of which can be disposed as scrap metal in conventional stator assembly processes).

In general, because the flux path is always aligned along the teeth, in the embodiments, even highly grain-oriented steels can be used, or even possibly laser scribed steels. As such, the yoke can be made from lower cost materials if desired, but since the flux path in the yoke is circumferential, grain oriented material would generally not be selected unless the stator yoke was edge-wound or tape-wound rather than if the yoke was made from a lamination stack. In either case, however, because the teeth are separable, the embodiments provide increased design and assembling flexibility.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A stator, including:
   a single piece yoke; and
   a set of teeth mounted on an inner surface of the single piece yoke, each tooth being pre-wound with a coil and including a tail portion configured to secure the tooth on the inner surface;
   wherein at least two teeth of the set of teeth are mounted on the single piece yoke at a slot opening distance of less than about 35% of an arc length extending from a center of one of the at least two teeth to a center of the other one of the at least two teeth; and
   a member disposed between at least one tooth of the set of teeth and an un-wound tooth of the set of teeth, to provide compression of a coil on a side of the at least one tooth, wherein the member is non-metallic.

2. The stator of claim 1, wherein at least one tooth from the set of teeth is made from a material different from a material of the single piece yoke.

3. The stator of claim 1, wherein at least one tooth from the set of teeth and the single piece yoke are made of a same material.

4. The stator of claim 1, wherein the coil is a copper filament.

5. The stator of claim 1, wherein the tail portion is a dove tail-shaped portion.

6. The stator of claim 1, wherein the member is substantially V-shaped.

7. The stator of claim 1, wherein the coil is encapsulated in an insulating layer.

8. The stator of claim 1, wherein the stator is part of a motor having tooth-wound armature coils.

9. The stator of claim 1, wherein teeth from the set of teeth are separable from the single piece yoke.

10. The stator of claim 1, wherein the single piece is an edge-wound yoke.

11. A method for assembling a stator of an electric machine, the method comprising:
    providing a single piece yoke;
    winding each tooth of a set of teeth with a coil; and
    mounting each tooth on an inner surface of the single piece yoke, subsequent to the winding;
    wherein at least two teeth of the set of teeth are mounted on the single piece yoke at a slot opening distance of less than about 35% of an arc length extending from a center of one the at least two teeth to a center of the other one of the at least two teeth; and
    disposing a member between at least one tooth of the set of teeth and an un-wound tooth of the set of teeth, to provide compression of a coil on a side of the at least one tooth, wherein the member is non-metallic.

12. The method of claim 11, further comprising encapsulating the coil.

13. The method of claim 11, wherein the member is a substantially V-shaped member.

14. The method of claim 11, wherein the winding is performed via a bobbin-winding process.

15. The method of claim 11, each tooth is mounted on the inner surface via a tail portion of the tooth.

16. The method of claim 15, wherein the tail portion is a dove tail-shaped portion.

17. The method of claim 11, wherein the winding is performed through an automated winding process.

* * * * *